United States Patent
Silverstein et al.

(10) Patent No.: US 12,153,904 B2
(45) Date of Patent: Nov. 26, 2024

(54) ROBOTIC PROCESS AUTOMATION

(71) Applicant: International Business Machines Corporation, Armonk, NY (US)

(72) Inventors: Zachary A. Silverstein, Austin, TX (US); Jacob Ryan Jepperson, St. Paul, MN (US); Jean Pommier, Cupertino, CA (US); William Taylor, Sammamish, WA (US); Sandeep Sinha, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/350,084

(22) Filed: Jun. 17, 2021

(65) Prior Publication Data

US 2022/0405064 A1 Dec. 22, 2022

(51) Int. Cl.
*G06F 8/34* (2018.01)
*G06F 3/04812* (2022.01)
*G06F 3/0482* (2013.01)
*G06F 3/0484* (2022.01)
(Continued)

(52) U.S. Cl.
CPC ............ *G06F 8/34* (2013.01); *G06F 3/04812* (2013.01); *G06F 3/0482* (2013.01); *G06F 3/0484* (2013.01); *G06F 8/38* (2013.01); *G06F 9/453* (2018.02)

(58) Field of Classification Search
CPC ... G06F 8/34; G06F 8/38; G06F 9/453; G06F 3/04812; G06F 3/0482; G06F 3/0484
See application file for complete search history.

(56) References Cited

U.S. PATENT DOCUMENTS

| 8,793,578 B2 | 7/2014 | Mounty et al. |
| 9,555,544 B2 | 1/2017 | Bataller et al. |
| 9,933,929 B1* | 4/2018 | Pitsillides ........... G06F 3/04842 |

(Continued)

FOREIGN PATENT DOCUMENTS

| JP | 2015165395 A | 9/2015 |
| WO | 2020061700 A1 | 4/2020 |

OTHER PUBLICATIONS

AI—Powered Automation, IBM, printed Apr. 22, 2021, 10 pages. https://www.ibm.com/cloud/automation.

(Continued)

*Primary Examiner* — Andrew T Chiusano
(74) *Attorney, Agent, or Firm* — Eric W. Chesley

(57) ABSTRACT

A method, system, and computer program product for automated identification and generation of user interface interactions for robotic process automation development are provided. The method identifies an interface environment including a set of user interface elements. The method identifies a set of element attributes associated with the set of user interface elements based on a user interface model. A set of automated interactions are generated based on the interface environment, the set of user interface elements, the set of element attributes, and the user interface model. An input interface is generated based on the set of automated interactions. The method generates program code for a thematic interface environment based on user input received through the input interface, the interface environment, the set of user interface elements, the set of element attributes, and the user interface model.

20 Claims, 8 Drawing Sheets

(51) Int. Cl.
  *G06F 8/38* (2018.01)
  *G06F 9/451* (2018.01)

(56) References Cited

U.S. PATENT DOCUMENTS

| | | | |
|---|---|---|---|
| 10,120,656 | B1 | 11/2018 | Singh et al. |
| 10,515,144 | B2 | 12/2019 | Jitkoff et al. |
| 10,908,931 | B2* | 2/2021 | Valtchev ................. G06F 9/542 |
| 10,936,351 | B2 | 3/2021 | Voicu |
| 11,385,777 | B2* | 7/2022 | Grigore ................. G06F 3/0484 |
| 2011/0196853 | A1 | 8/2011 | Bigham et al. |
| 2013/0311877 | A1* | 11/2013 | Ebner ................... G06F 40/143 715/236 |
| 2014/0033091 | A1* | 1/2014 | Schein ................ G06F 9/45512 715/764 |
| 2014/0068470 | A1* | 3/2014 | DiVita ...................... G06F 8/36 715/762 |
| 2015/0082214 | A1* | 3/2015 | Roessler ................. G06F 9/451 715/765 |
| 2017/0228119 | A1* | 8/2017 | Hosbettu ................. G06Q 10/00 |
| 2018/0365025 | A1 | 12/2018 | Almecija et al. |
| 2019/0265990 | A1 | 8/2019 | Hall et al. |
| 2020/0159647 | A1* | 5/2020 | Puszkiewicz ....... G06F 11/3664 |
| 2020/0223061 | A1 | 7/2020 | Han et al. |
| 2020/0334325 | A1* | 10/2020 | Courouble ............ G06F 40/106 |
| 2020/0380432 | A1 | 12/2020 | Wang et al. |
| 2021/0042110 | A1* | 2/2021 | Basyrov ................. G06N 3/006 |
| 2021/0158268 | A1* | 5/2021 | Berg .................... G06F 16/2465 |
| 2021/0232375 | A1* | 7/2021 | Weibel ................ H04L 63/0815 |
| 2021/0240910 | A1* | 8/2021 | Lundin ................... G06F 9/451 |
| 2022/0012024 | A1* | 1/2022 | Grigore ................... G06F 9/451 |
| 2022/0113991 | A1* | 4/2022 | Singh .................... G06F 18/214 |
| 2022/0198562 | A1* | 6/2022 | Cella ....................... G06Q 40/04 |
| 2022/0222046 | A1* | 7/2022 | Schoppe ................. G06F 9/451 |

OTHER PUBLICATIONS

Robotic Process Automation, IBM, printed Apr. 22, 2021, 6 pages. https://www.ibm.com/products/robotic-process-automation.

"Using the smart recorder", Automation Anywhere, Version 11.3, updated May 13, 2020, https://docs.automationanywhere.com/bundle/enterprise-v11.3/page/enterprise/topics/aae-client/bot-creator/creating-an-automation-task/using-the-smart-recorder.html.

Mell et al., "The NIST Definition of Cloud Computing", Recommendations of the National Institute of Standards and Technology, Special Publication 800-145, Sep. 2011, 7 pages.

* cited by examiner

ROBOTIC PROCESS AUTOMATION

BACKGROUND

Robotic Process Automation (RPA) is a technological area where software robots execute scripts and automation files to interact with computers in a manner that attempts to approximate human users. RPA automation tasks are sometimes used in user interface automation. Some RPA implementations enable selection of user interface elements and leverage tolerances and image matching. Information from the tolerances and image matching is often passed to a bot to perform the RPA automation tasks. Some software bot implementations enable capture of single artifacts using hierarchy identification. Some software bot implementations drag and drop of selectable user interface elements in a web browser to cause an automated response to the user selection. Some software bot implementations provide automated form fields in documents.

SUMMARY

According to an embodiment described herein, a computer-implemented method for automated identification and generation of user interface interactions for robotic process automation development is provided. The method identifies an interface environment including a set of user interface elements. The method identifies a set of element attributes associated with the set of user interface elements based on a user interface model. A set of automated interactions are generated based on the interface environment, the set of user interface elements, the set of element attributes, and the user interface model. An input interface is generated based on the set of automated interactions. The method generates program code for a thematic interface environment based on user input received through the input interface, the interface environment, the set of user interface elements, the set of element attributes, and the user interface model.

Further aspects of the present disclosure are directed to a computer-implemented method for automated identification and generation of user interface interactions by performing object recognition on themed interface attributes within a set of themed graphical user interfaces. The method generates an artifact schema based on the themed interface attributes. The method generates a set of user interface models based on sets of interface attributes. The method generates an artifact schema based on the set of user interface models. The user interface model on which the set of automated interactions is generated is one or more user interface model of the set of user interface models.

According to an embodiment described herein, a system for automated identification and generation of user interface interactions for robotic process automation development is provided. The system includes one or more processors and a computer-readable storage medium, coupled to the one or more processors, storing program instructions that, when executed by the one or more processors, cause the one or more processors to perform operations. The operations identify an interface environment including a set of user interface elements. The operations identify a set of element attributes associated with the set of user interface elements based on a user interface model. A set of automated interactions are generated based on the interface environment, the set of user interface elements, the set of element attributes, and the user interface model. An input interface is generated based on the set of automated interactions. The operations generate program code for a thematic interface environment based on user input received through the input interface, the interface environment, the set of user interface elements, the set of element attributes, and the user interface model.

Further aspects of the present disclosure are directed to a system for automated identification and generation of user interface interactions by performing object recognition on themed interface attributes within a set of themed graphical user interfaces. The system performs operations to generate an artifact schema based on the themed interface attributes. The operations generate a set of user interface models based on sets of interface attributes. The operations generate an artifact schema based on the set of user interface models. The user interface model on which the set of automated interactions is generated is one or more user interface model of the set of user interface models.

According to an embodiment described herein, a computer program product for automated identification and generation of user interface interactions for robotic process automation development is provided. The computer program product includes a computer-readable storage medium having program instructions embodied therewith, the program instructions being executable by one or more processors to cause the one or more processors to identify an interface environment including a set of user interface elements. The computer program product identifies a set of element attributes associated with the set of user interface elements based on a user interface model. A set of automated interactions are generated based on the interface environment, the set of user interface elements, the set of element attributes, and the user interface model. An input interface is generated based on the set of automated interactions. The computer program product generates program code for a thematic interface environment based on user input received through the input interface, the interface environment, the set of user interface elements, the set of element attributes, and the user interface model.

Further aspects of the present disclosure are directed to a computer program product for automated identification and generation of user interface interactions by performing object recognition on themed interface attributes within a set of themed graphical user interfaces. The computer program product generates an artifact schema based on the themed interface attributes. The computer program product generates a set of user interface models based on sets of interface attributes. The computer program product generates an artifact schema based on the set of user interface models. The user interface model on which the set of automated interactions is generated is one or more user interface model of the set of user interface models Further aspects of the present disclosure are directed toward a system comprising a computational environment configured to present a graphical user interface (GUI) on a display. The system further comprises an application configured to run the computational environment. The system further comprises an RPA bot configured to execute tasks on the application using the GUI.

The present summary is not intended to illustrate each aspect of, every implementation of, and/or every embodiment of the present disclosure.

Figure 1:
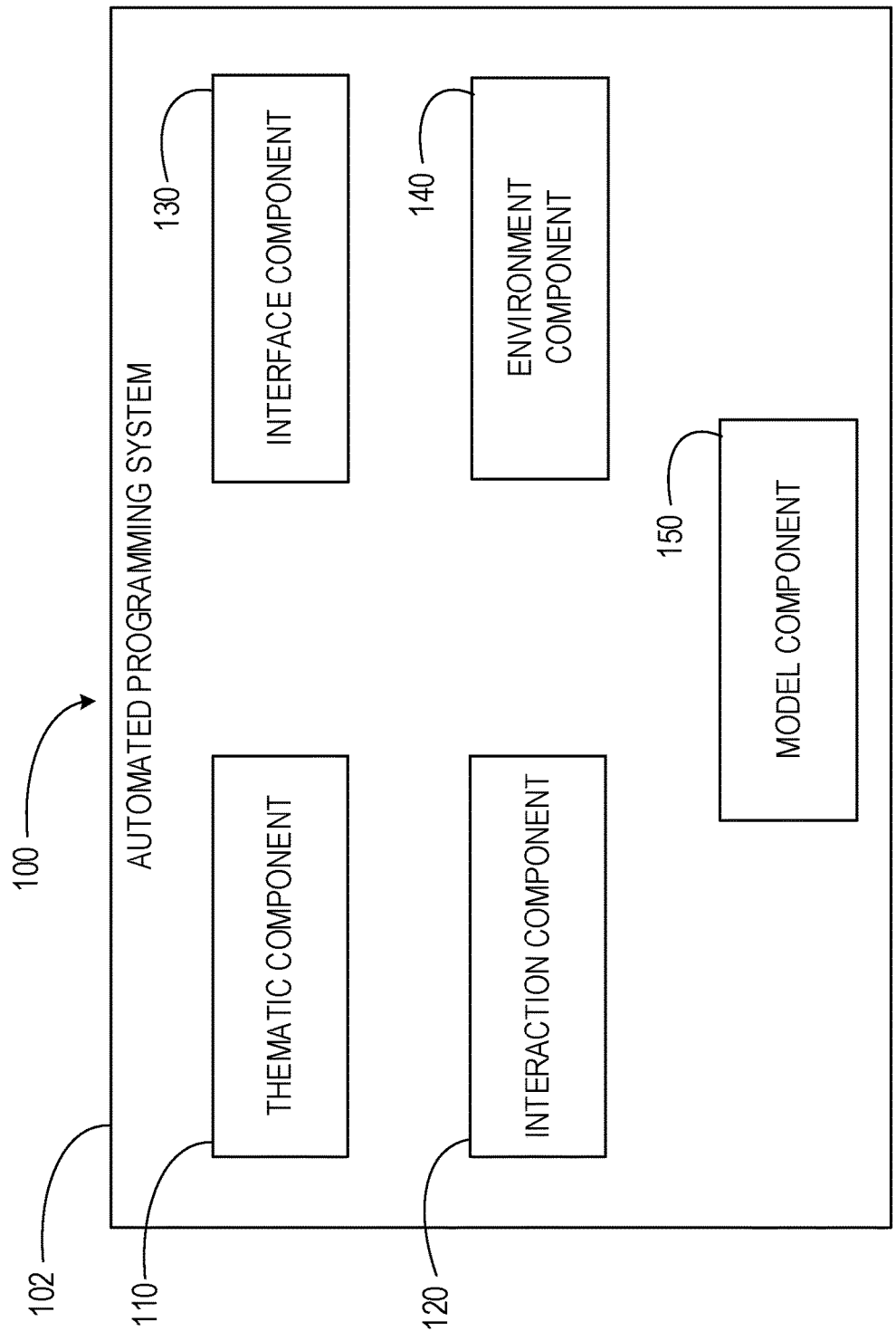
FIG. 1 depicts a block diagram of a computing environment for implementing concepts and computer-based methods, according to at least one embodiment.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

The present disclosure relates generally to methods for processing user interfaces for automation script autocreation. More particularly, but not exclusively, embodiments of the present disclosure relate to a computer-implemented method for automated identification and generation of user interface interactions for robotic process automation development. The present disclosure relates further to a related system for processing user interfaces for automation script autocreation, and a computer program product for operating such a system.

RPA is a technology area enabling software robots to execute scripts and automation files. The software robots may interact with computers in a manner approximating real-world human users. Automation tasks of RPA may involve user interface automation in which elements are selected based on element identification. Element identification may involve hyper text markup language (HTML) attributes, object model attributes, and object/image recognition of specific items within a user interface environment. When utilizing object/image recognition, RPA software bots frequency tolerances are leveraged and a matching image is provided to the software bot to find by scanning a screen for a match. However, RPA software bots often encounter errors or difficulties with tolerances. Further, these tolerances are often difficult to obtain and are computationally expensive. These issues proliferate as more elements are to be identified for use by the RPA software bots.

Embodiments of the present disclosure leverage image capture, scraping, and recognition functionality for automation of RPA tasks and software bots to accelerate and increase accuracy and functionality of those tasks and software bots. Some embodiments of the present disclosure enable increased speed in processing pages for automation script autocreation functions. Embodiments of the present disclosure utilize trained machine learning to identify elements on a user interface page. The machine learning models used in the present disclosure may use object recognition functionality. The machine learning models extract subcomponents, aspects, and attributes of identified elements using object recognition. Embodiments of the present disclosure, using machine learning models, enable software bots to auto-discover and provide automated interface operations for application and content interaction. Some embodiments of the present disclosure dynamically and automatically generate wizard interfaces to assist in RPA development. Some embodiments of the present disclosure utilize thematic elements within a user interface to train machine learning models to automatically generate theme-based user interface elements and user interface interactions for automated program code and user interface generation. Thematic elements are thus used to auto-create templated wizard interactions for semi or fully automated user interface generation within an identified theme.

Embodiments of the present disclosure may automatically generate software or program code to increase speeds for generating user interfaces. Some embodiments of the present disclosure allow webpage and enterprise applications to be processed, labels extracted, and coordinates derived to build accurate coordinate interactions for a user interface generation wizard. Embodiments of the present disclosure enable autonomous discovery of web pages, user interface widgets, and recognition of elements to automatically generate RPA bot scripts. The RPA bot scrips use discovered web page elements and auto fills with configurable external values to generate themed user interfaces.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an automated programming system 102. The automated programming system 102 may comprise a thematic component 110, an interaction component 120, an interface component 130, an environment component 140, and a model component 150. The thematic component 110 identifies interface environments and thematic attributes of the interface environments. The interaction component 120 generates sets of automated interactions for user input. The interface component 130 generates user and input interfaces based on sets of automated interactions. The environment component 140 generates program code for thematic interface environments and executes the program code on the interface environment to generate themed user interface environments. The model component 150 generates sets of user interface models based on artifact schema based on interface environments and thematic attributes. Although described with distinct components, it should be understood that, in at least some embodiments, components may be combined or divided, and/or additional components may be added without departing from the scope of the present disclosure.

Figure 2:
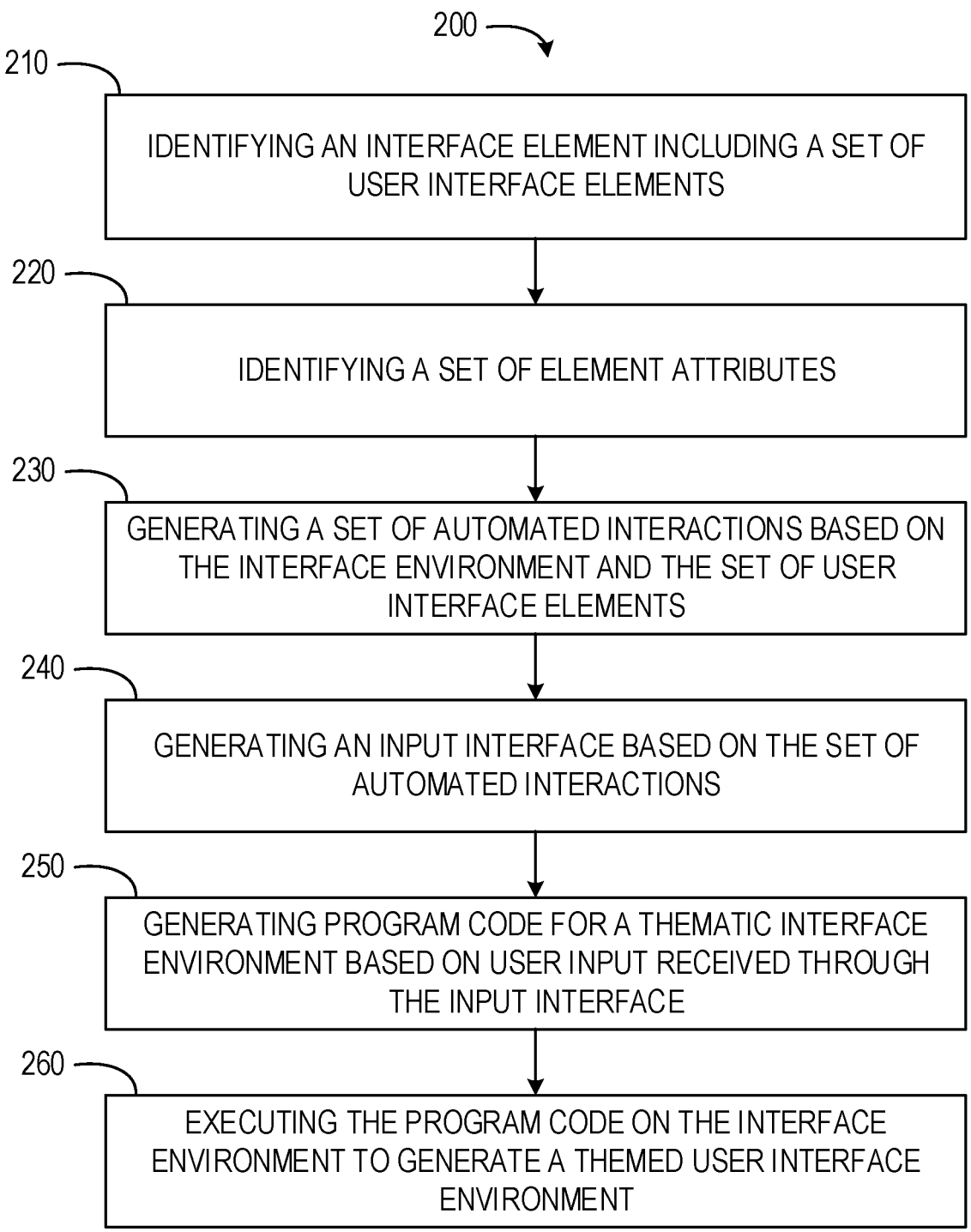
FIG. 2 depicts a flow diagram of a computer-implemented method for generation of user interface interactions for robotic process automation development, according to at least one embodiment.

Referring now to FIG. 2, a flow diagram of a computer-implemented method 200 is shown. The computer-implemented method 200 is a method for automated identification and generation of user interface interactions for robotic process automation development. In some embodiments, the computer-implemented method 200 may be performed by one or more components of the computing environment 100, as described in more detail below.

Figure 3:
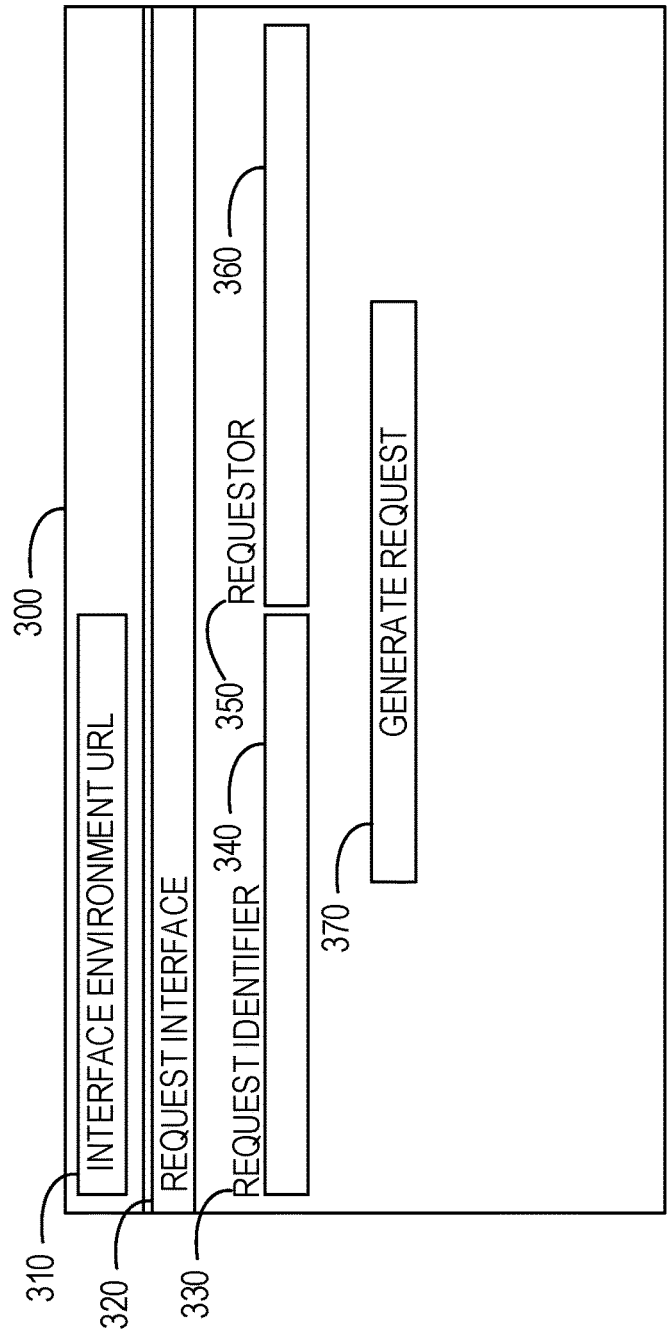
FIG. 3 depicts an interface environment for robotic process automation development, according to at least one embodiment.

At operation 210, the thematic component 110 identifies an interface environment. As shown in FIG. 3, for example, an interface environment 300 may be presented for identification by the thematic component 110. In some embodiments, the interface environment includes a set of user interface elements. The interface environment, such as a web page, may include user interface elements. As shown in FIG. 3, the interface environment 300 includes an interface environment URL 310. The user interface elements may include element attributes associated with each user interface element. User interface elements may include selectable or actionable user interface elements such as buttons, menus, toggles, text entry fields, links, selectable visual elements, selectable audio elements, or any other user selectable or modifiable element. User interface elements may also include banners, logos, images, or any other static or non-selectable interface element. As shown in FIG. 3, the interface environment 300 includes user interface elements 320, 330, 340, 350, 360, and 370. A first user interface element 320 may include an environment title comprising a banner on the interface environment 300. A second user interface element 330 is a first element title indicating a name or designation of a first selectable element 340. The first selectable element 340 may be a text entry field or other user interface element capable of manipulation by a user. A third user interface element 350 is a second element title indicating a name or designation of a second selectable element 360. The second selectable element 350 may be a text entry field or other user interface element capable of manipulation by a user. A third selectable element 370 may also be included to enable selection or manipulation by a user.

The thematic component 110 may identify the interface environment based on a connection established by a developer. The developer may provide access to the interface environment for components of the automated programming system 102 via a visual processing element or functionality. For example, the developer may provide access to the interface environment by passing a URL, a screen shot, or an application window to components of the automated programming system 102.

In some embodiments, the thematic component 110 identifies the interface environment as a website, a web page, an application, an enterprise application suite, or any other suitable interface environment. The thematic component 110 may identify the interface environment as an input provided by a user or developer. In such instances, the interface environment may be a graphical interface the user is seeking to automate and develop using an RPA bot associated with or formed by the automated programming system 102. In some instances, the developer may install software containing the interface environment, as well as browser and user interface artifacts within a development environment, with permissions to access RPA bot software.

Figure 4:
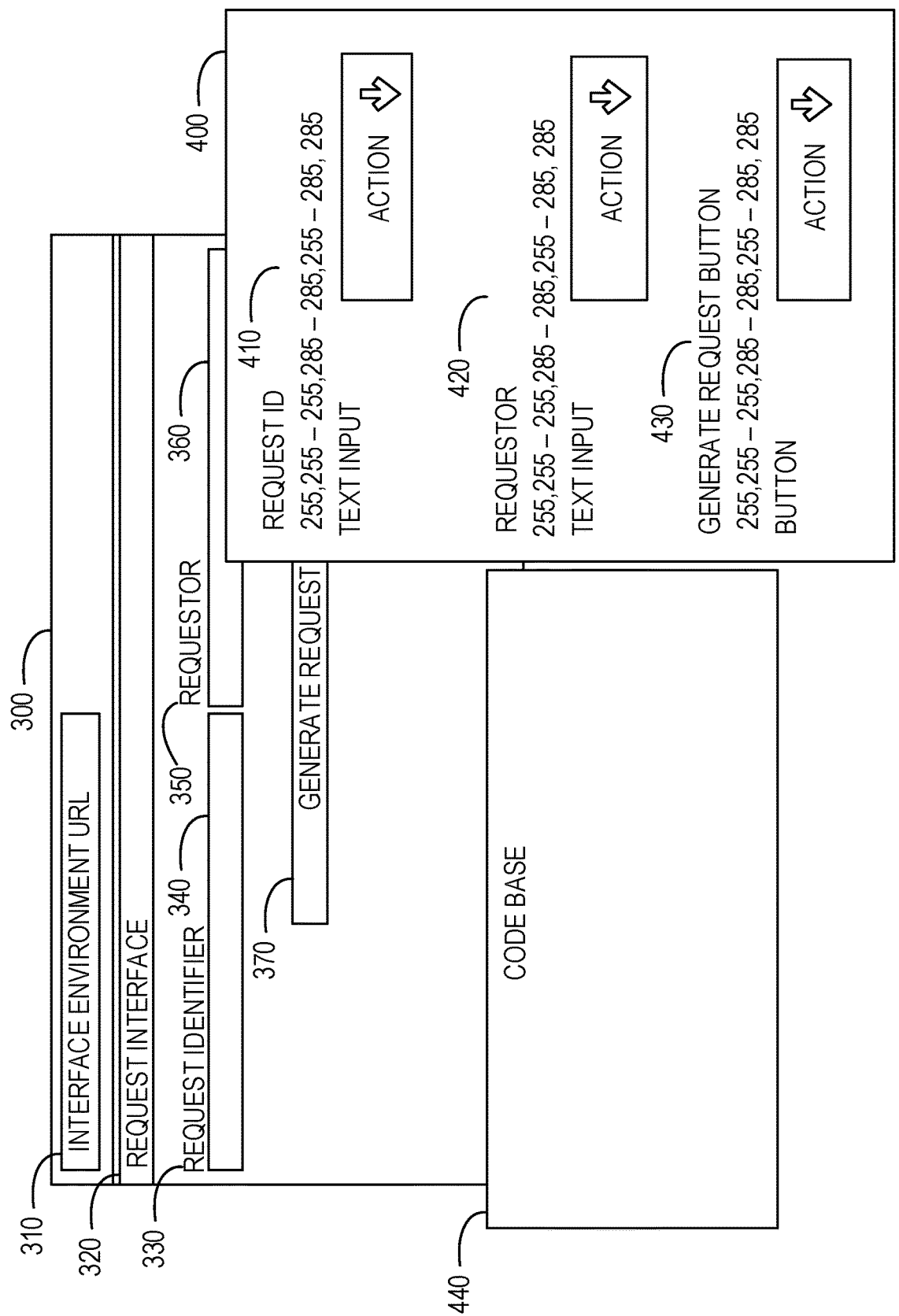
FIG. 4 depicts a user interface depicting a portion of robotic process automation development, according to at least one embodiment.

At operation 220, the thematic component 110 identifies a set of element attributes. As shown in FIG. 4, a user interface 400 is presented where the element attributes may be identified as first set of element attributes 410 corresponding to the first selectable element 340, a second set of element attributes 420 corresponding to the second selectable element 360, and a third set of element attributes 430 corresponding to the third selectable element 370. The set of elements may be subdivided into fields (e.g., field name, input area, options of automation). For example, as shown in FIG. 4, the first set of element attributes 410, the second set of element attributes 420, and the third set of element attributes 430 may each contain field names of the associated selectable element, coordinates for associated selectable element, and an input type of the associated selectable element. In some embodiments, the set of element attributes are associated with the set of user interface elements. The thematic component 110 may identify the set of element attributes based on a user interface model. The set of element attributes may include coding used to generate or display each user interface element, coordinates of each user interface element, a size of each user interface element, a type of each user interface element, field names, input areas, options for automation (e.g., clicking a button or inserting text), combinations thereof, or any other suitable set of attributes.

In some embodiments, the thematic component 110 performs a visual scrape of the interface environment. The visual scrape may be performed by using visual processing functionality on the interface component, using visual processing functionality on a screenshot of the interface environment along with screen coordinates, or integration with an object model and stored parameters and attributes of the interface environment. The visual scrape may be performed on the interface environment once a developer provides the interface environment to the thematic component 110. The visual scrape may extract data from the interface environment. In some instances, the thematic component 110 performs the visual scrape to extract base64 encoded image type, screen coordinate, and other data from the interface environment. Each element within the interface environment may be represented within the data extracted by the visual scrape.

In some embodiments, the thematic component 110 generates an element array for the set of user interface elements included in the interface environment. The thematic component 110 may identify element data, metadata, and thematic data for each onscreen element within the interface environment. The array may include element types, element input types, coordinates, and other suitable information. The thematic component 110 may then classify each element into logical groupings. In some instances, the logical groupings may be based on visual adjacency.

In some embodiments, the operation 220 is performed by passing a full page or view of the interface environment to a machine learning model generated for a larger thematic environment in which the interface environment is being developed. The thematic component 110, using the machine learning model, differentiates and visually identifies each and every present element within the screen. Each element is tagged with metadata components. The metadata components may include field names, coordinates of an input area (e.g., X,Y coordinates within the interface environment), element types, associated or proximate elements, and element hierarchies. The associated or proximate elements and element hierarchies may enable logical grouping of elements within the interface environment.

At operation 230, the interaction component 120 generates a set of automated interactions. In some embodiments, the set of automated interactions are generated based on the interface environment, the set of user interface elements, the set of element attributes, and the user interface model. The set of automated interactions may be generated by registering distinct onscreen elements and programmatically generating actionable user interface elements to which a developer may respond and input data relevant to the interface environment and element attributes. The input data from the developer may be used to generate quick automation code for an RPA accelerator interface. For example, the developer may input screen coordinates in response to an automated interaction when the screen coordinates are used to actuate software and robotic cursor clicking and coordinate an interaction. The automated interactions may be configured to leverage pre-defined actions associated with each element, based on each element's attributes. In some embodiments, the set of automated interactions are wizard interactions. The set of automated interactions may be based on a plurality of quick selection interactions for a developer to input data for use by the RPA bot.

At operation 240, the interface component 130 generates an input interface based on the set of automated interactions. In some embodiments, the input interface is a wizard interface. The wizard interface may include at least a portion of the set of automated interactions for quick selection actions rendered into a user interface for a developer to input data for use by the RPA bot. In some embodiments, the set of automated interactions and the input interface are generated within or embedded into RPA tooling.

In some embodiments, the interaction component 120 and the interface component 130 cooperate to limit an amount of presented user interface elements for automation. The interaction component 120 and the interface component 130 may cooperate to limit the displayed user interface elements by performing topic analysis of the interface environment, user interface elements within the interface environment, element attributes, and a corpus of interface environments (e.g., a set of thematic environments). In some instances, the interaction component 120 and the interface component 130 cooperate to limit the displayed user interface elements by performing co-sine similarity analysis on field identifications of the interface environment compared to a corpus of variables from the corpus of interface environments by creating a taxonomy score. For example, where only one variable call currency Amount is available, the RPA bot may allow for automation of a field called Currency Amount.

At operation 250, the environment component 140 generates program code for a thematic interface environment. For example, as shown in FIG. 4, the program code may be generated as a code base 440 for the thematic interface environment. The program code is generated based on user input received through the input interface. In some embodiments, the program code is generated based on the user input, the interface environment, the set of user interface elements, the set of element attributes, and the user interface model. The program code may be a set of program code lines within an extension, an automation file, or a collection of lines of code. The program code may be inserted into a developer's RPA bot development.

The environment component 140 may receive input from the developer through the wizard-like input interface. The input may indicate desired variables and actions for each element to be included in the thematic interface environment. The variables and actions may be input for each element at a user interface level without direct integration.

At operation 260, the environment component 140 executes the program code on the interface environment to generate a themed user interface environment. The environment component 140, executing the program code, may generate and insert templated automation code into the themed user interface environment based on known coordinates extracted from screen elements of the interface environment and templated code generated from the user input in the RPA bot user interface. In some embodiments, the environment component 140 may execute the program code as an RPA bot or as part of an RPA bot. The RPA bot may execute the program code based on known visual scraping from screen capture information of the interface environment. The RPA bot may execute the program code using coordinate automation. The coordinates may be identified from the interface environment, a set of interface environments, or information provided by a user or developer. In some instances, the RPA bot executes the program code based on information input from a user or developer. The information may be provided from click or text entry selected or entered by the user or developer.

For example, as described by the method 200, a developer may be building out automation for a company. The company may use a theme throughout their enterprise on process and workflow tools of product A. Product A elements may use a standard theme. At least a portion of product A may be exposed to the components of the automated programming system 102. The components may identify the thematic elements of Product A and train a model based on the thematic elements and user interface elements within Product A. The components may automatically parse HTML and DOM object model elements to identify and understand elements of Product A. Through parsing of the elements, the components may determine click, focus, mousing, and other actions which can be performed on elements within Product A. The components may also determine input types, such as checking and unchecking of boxes. In some instances the developer assists in automatically training the models by selecting possible interaction types and an underlying schema. The components of the automated programming system 102 ingest the elements and generate a robust user interface model. The model may then be used to identify elements of Product A to be automatically developed and metadata associated with each element, such as label and input location. The developer may then initiate a portion of the components of the automated programming system 102. The initiated components may be connected to a corpus of themes and elements generated from portions of Product A or other enterprise suite applications of the company. The developer may submit a URL to the initiated components. The initiated components may ingest screen elements of the URL and an array of the user interface items. The initiated components may then dynamically generate a user interface for the developer to input values. The initiated components, based on the input values, generate and execute code for a wizard-like interface. The initiated components, based on information input into the wizard-like interface, generate a themed user interface for the URL provided by the developer.

Figure 5:
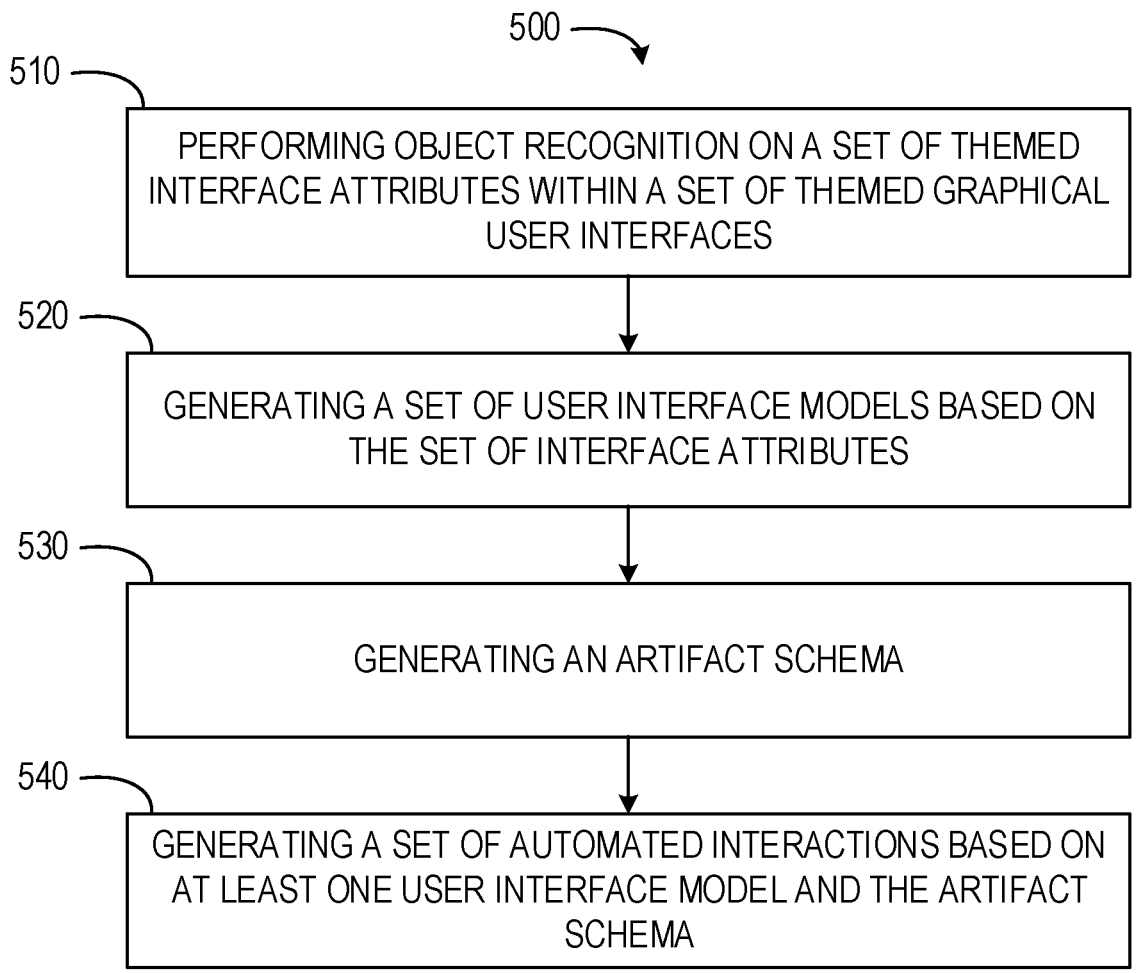
FIG. 5 depicts a flow diagram of a computer-implemented method for generation of user interface interactions for robotic process automation development, according to at least one embodiment.

FIG. 5 shows a flow diagram of an embodiment of a computer-implemented method 500 for automated identification and generation of user interface interactions for robotic process automation development. The method 500 may be performed by or within the computing environment 100. In some embodiments, the method 500 comprises or incorporates one or more operations of the method 200. In some instances, operations of the method 500 may be incorporated as part of or sub-operations of the method 200.

In operation 510, the thematic component 110 performs object recognition on a set of themed interface attributes within a set of themed graphical user interfaces. The thematic component 110 may perform object recognition of enterprise theming and consistent UI elements present within an application, an application suite, a web page, a web site, or any other graphical content.

In some embodiments, the themed interface attributes include an enterprise theme and a set of themed user interface elements. The enterprise theme and the set of themed user interface elements may recur within at least a portion of the themed graphical user interfaces of the set of themed graphical user interfaces.

In some instances, the thematic component 110 initiates object recognition based on a user or developer selection. The user may activate an application including or interacting with the automated programming system 102. The user may provide the thematic component 110 with user interfaces, web pages, websites, or other interface environments of an enterprise or application as a set of thematic information. The thematic information may be fed into the thematic component 110 manually or automatically. Manual feeding of the thematic information may be performed by selecting certain user interfaces, web pages, or websites for use by the thematic component 110. The thematic information may be fed to the thematic component 110 by initiating an application associated with the automated programming system 102 while running the enterprise environment or application to be analyzed.

In operation 520, the model component 150 generates a set of user interface models based on the set of interface attributes. The model component 150 may be fed thematic information subject to object recognition by the thematic component 110. Each model of the set of user interface models may be trained from a manually trained corpus or an automatically trained corpus comprising characteristics or aspects identified within the thematic information. In some instances, this model training is performed as component type training using supervised or unsupervised learning by machine learning algorithms. The component training may train the RPA bot, or relevant components of the automated programming system 102, to recognize user interface elements via visual recognition. Further, the component training may train the RPA bot or relevant components how each interactable element is defined and depicted for a themed environment, such as an enterprise suite.

The model component 150 may generate a user interface model for the thematic information or a plurality of user interface models. In some instances, the model component 150 generates the set of user interface models so that each model or a subset of models is generated for distinct portions or aspects of the thematic information of the interface, web page, website, or other interface environment. For example, the model component 150 may generate an element identification model. The element identification model may define a type of user interface element (e.g., button), an input type (e.g., text), a menu type (e.g., drop down), and other aspects of one or more user interface elements within the thematic information. The model component 150 may also generate models for specified user interface element types, defining aspects of each user interface element type, such as labels, boundaries, and coordinates. In some embodiments, one model is generated for an overall theme of the thematic information and a plurality of models may be generated for each sub-artifact within the theme.

In some embodiments, the model component 150 generates a learning loop. The learning loop may be generated to continuously generate or modify at least a portion of the user interface models over time. The model component 150 may modify or re-generate the portion of user interface models with interface environments, user interface elements, element attributes, coordinates, and other information depicted within, defining, or describing thematic interface environments. The learning loop may detail how pages, screens, or interface environments grow or change over time with static and non-static elements, such as HTML elements. In some embodiments, the learning loop represents component training from repeated RPA iterations of the interface environment or thematic information.

In operation 530, the model component 150 generates an artifact schema. The artifact schema may be actionable, used as input for machine learning models and generation of RPA bot generated content. The artifact schema may include artifacts that are able to be captured based on visual processing by feeding a desired webpage, uniform resource locator (URL), or user interface to components of the present disclosure. In some embodiments, the artifact schema is generated based on the set of themed interface attributes. In some embodiments, the artifact schema is generated based on the set of user interface models and the set of themed interface attributes.

In operation 540, the interaction component 120 generates a set of automated interactions based on at least one user interface model of the set of user interface models. The interaction component 120 may generate the set of automated interactions in a manner similar to or the same as described above with respect to operations 230 and 240.

Figure 6:
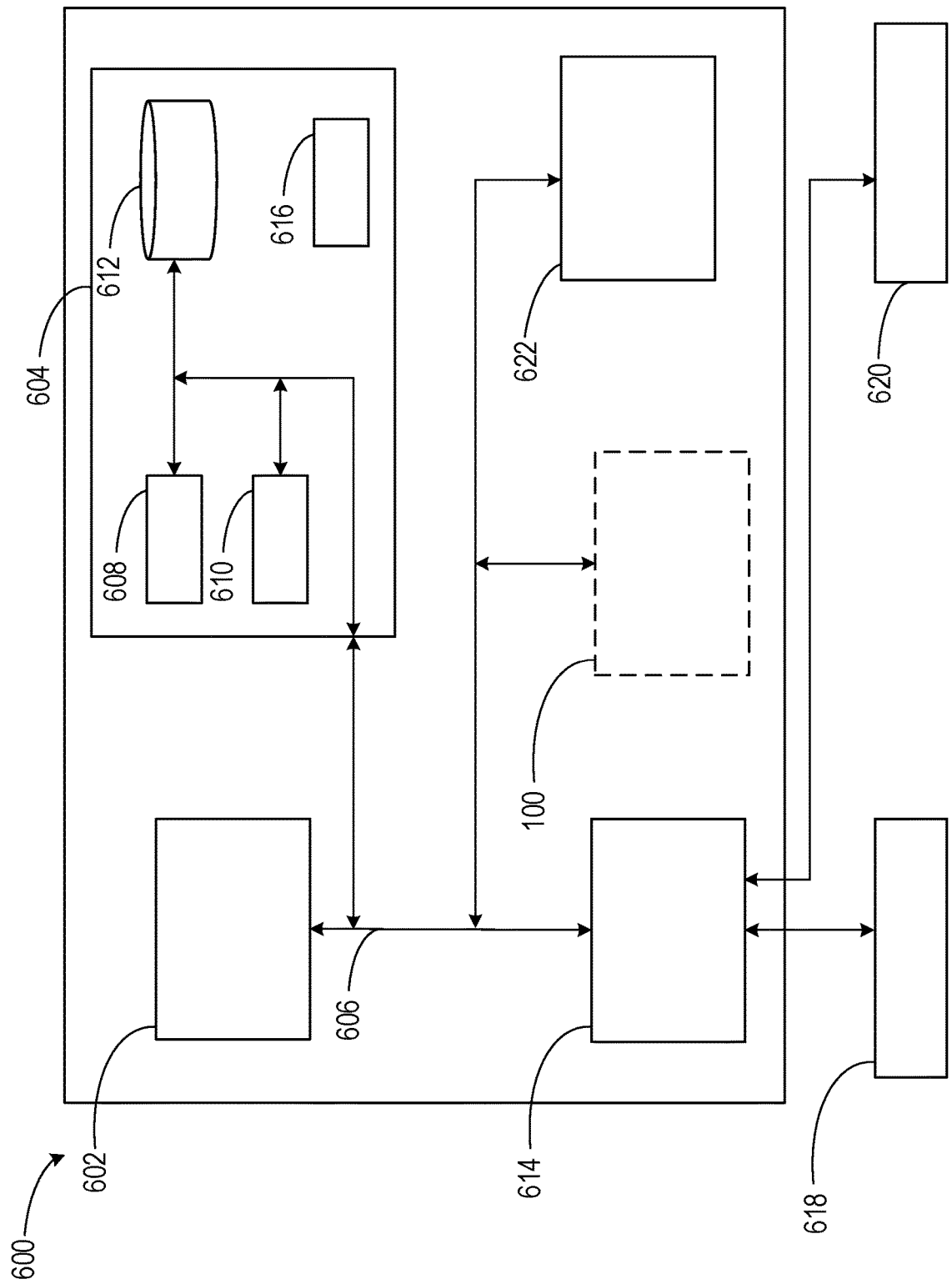
FIG. 6 depicts a block diagram of a computing system for generation of user interface interactions for robotic process automation development, according to at least one embodiment.

Embodiments of the present disclosure may be implemented together with virtually any type of computer, regardless of the platform is suitable for storing and/or executing program code. FIG. 6 shows, as an example, a computing system 600 (e.g., cloud computing system) suitable for executing program code related to the methods disclosed herein and for automated identification and generation of user interface interactions for robotic process automation development.

The computing system 600 is only one example of a suitable computer system and is not intended to suggest any limitation as to the scope of use or functionality of embodiments of the present disclosure described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors 602 (e.g., processing units), a system memory 604 (e.g., a computer-readable storage medium coupled to the one or more processors), and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random-access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, the system memory 604 may include at least one program product having a set (e.g., at least one) of program modules that are configured to carry out the functions of embodiments of the present disclosure.

The program/utility, having a set (at least one) of program modules 616, may be stored in the system memory 604 by way of example, and not limiting, as well as an operating system, one or more application programs, other program modules, and program data. Program modules may include one or more of the thematic component 110, the interaction component 120, the interface component 130, the environment component 140, and the model component 150, which are illustrated in FIG. 1. Each of the operating systems, one or more application programs, other program modules, and program data or some combination thereof, may include an implementation of a networking environment. Program modules 616 generally carry out the functions and/or methodologies of embodiments of the present disclosure, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that, although not shown, other hardware and/or software components could be used in conjunction with computer system/server 600. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 7:
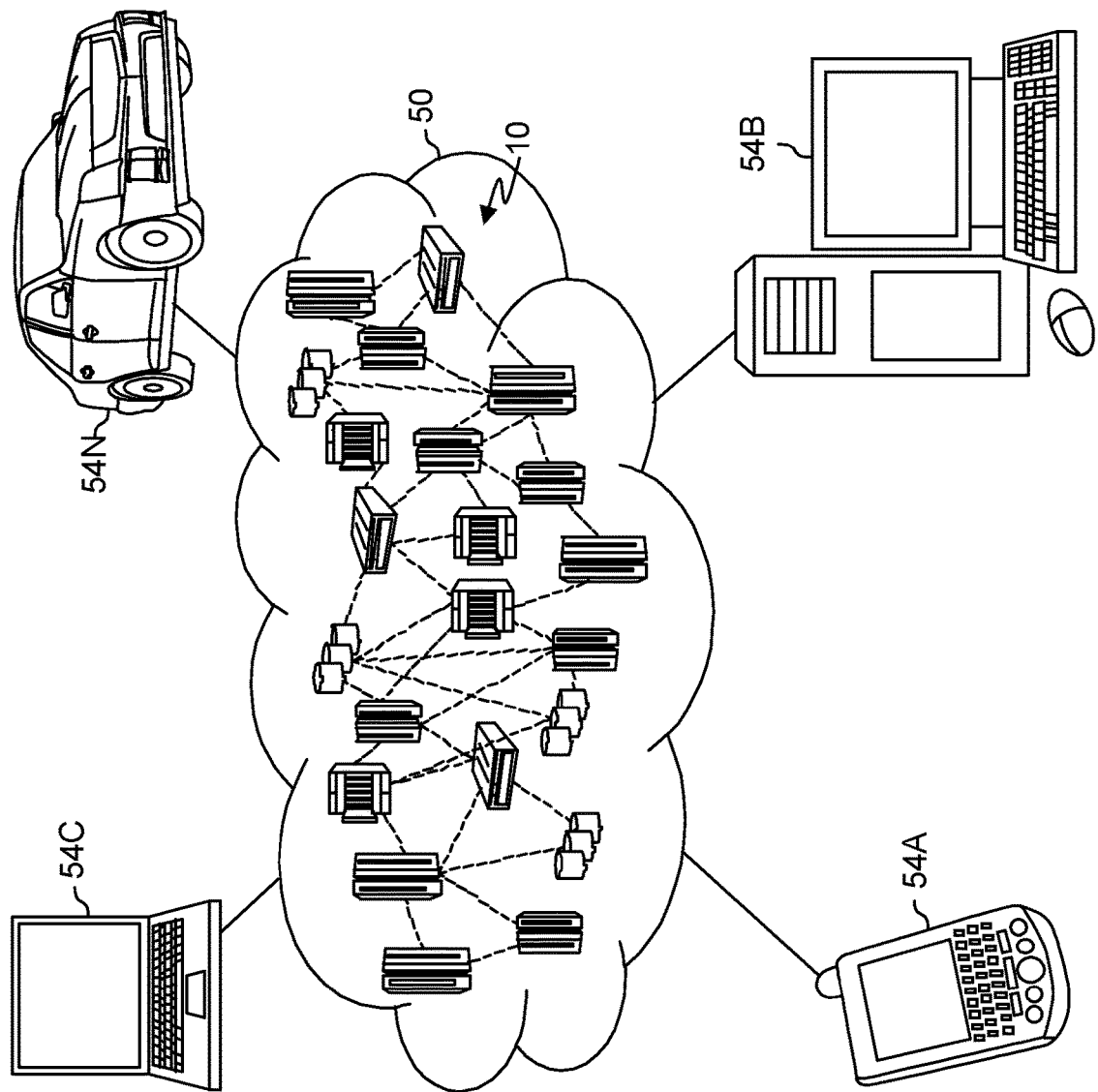
FIG. 7 is a schematic diagram of a cloud computing environment in which concepts of the present disclosure may be implemented, in accordance with an embodiment of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
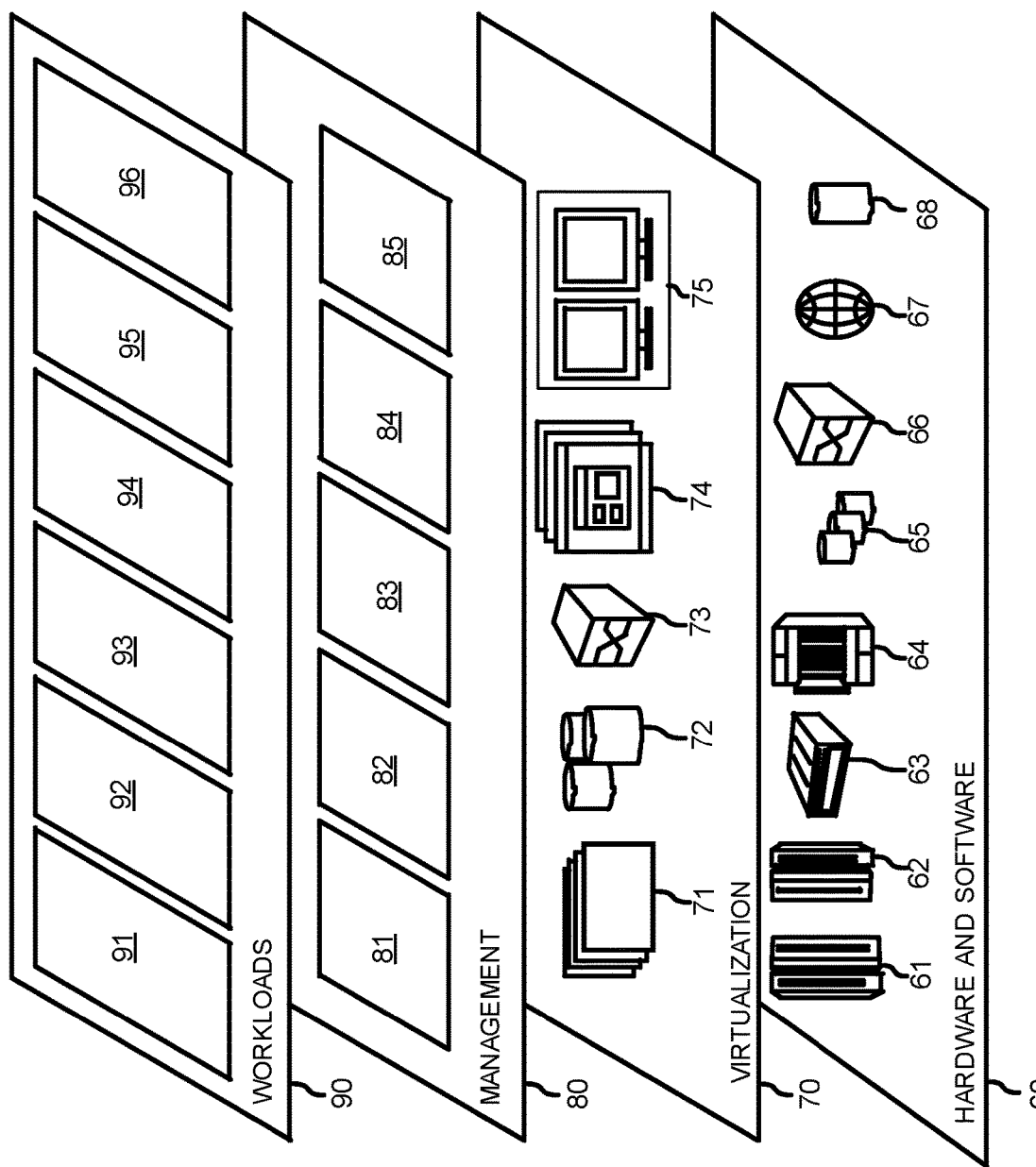
FIG. 8 is a diagram of model layers of a cloud computing environment in which concepts of the present disclosure may be implemented, in accordance with an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and thematic automated interaction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a set of themed interface attributes within a set of themed graphical user interfaces including a set of themed user interface elements, wherein the set of themed user interface elements is formed by classifying user interface elements in the set of themed graphical user interfaces into a logical grouping based on thematic data derived from the user interface elements;
   generating an artifact schema based on the set of themed interface attributes using a set of user interface models;
   generating a set of automated interactions for obtaining user input data for configuring a thematic interface environment that is based on the artifact schema and the set of user interface models;
   generating an input interface based on the set of automated interactions to obtain the user input data for configuring the thematic interface environment; and
   generating program code for the thematic interface environment based on the user input data received through the input interface, the artifact schema, and the set of user interface models.

2. The method of claim 1, wherein generating the artifact schema further comprises:
   performing object recognition on the set of themed interface attributes within the set of themed graphical user interfaces.

3. The method of claim 2, wherein the set of themed interface attributes includes an enterprise theme and a set of themed user interface elements, the enterprise theme and the set of themed user interface elements recurring within at least a portion of the themed graphical user interfaces of the set of themed graphical user interfaces.

4. The method of claim 2, further comprising:
   generating the set of user interface models based on the set of themed interface attributes.

5. The method of claim 4, wherein the user interface model on which the set of automated interactions is generated is one or more user interface model of the set of user interface models.

6. The method of claim 1, further comprising:
   performing a visual scrape of the set of themed graphical user interfaces; and
   generating an element array for the set of themed user interface elements included in the set of themed graphical user interfaces.

7. The method of claim 1, wherein classifying the user interface elements in the set of themed graphical user interfaces into the logical grouping further comprises:
   grouping the user interface elements based in part on visual adjacency.

8. The method of claim 1, wherein generating the set of automated interactions includes:
   generating actionable user interface elements; and
   configuring the actionable user interface elements based on the user input data obtained from the input interface.

9. A system, comprising:
   one or more processors; and
   a computer-readable storage medium, coupled to the one or more processors, storing program instructions that, when executed by the one or more processors, cause the one or more processors to perform operations comprising:
   identifying a set of themed interface attributes within a set of themed graphical user interfaces including a set of themed user interface elements, wherein the set of themed user interface elements is formed by classifying user interface elements in the set of themed graphical user interfaces into a logical grouping based on thematic data derived from the user interface elements;
   generating an artifact schema based on the set of themed interface attributes using a set of user interface models;
   generating a set of automated interactions for obtaining user input data for configuring a thematic interface environment that is based on the artifact schema and the set of user interface models;
   generating an input interface based on the set of automated interactions to obtain the user input data for configuring the thematic interface environment; and
   generating program code for the thematic interface environment based on the user input data received through the input interface, the artifact schema, and the set of user interface models.

10. The system of claim 9, wherein generating the artifact schema further comprises:

performing object recognition on the set of themed interface attribute within the set of themed graphical user interfaces.

11. The system of claim 10, wherein the set of themed interface attributes includes an enterprise theme and a set of themed user interface elements, the enterprise theme and the set of themed user interface elements recurring within at least a portion of the themed graphical user interfaces of the set of themed graphical user interfaces.

12. The system of claim 10, wherein the operations further comprise:
generating the set of user interface models based on the set of themed interface attributes.

13. The system of claim 12, wherein the user interface model on which the set of automated interactions is generated is one or more user interface models of the set of user interface models.

14. The system of claim 9, wherein the operations further comprise:
performing a visual scrape of the set of themed graphical user interfaces; and
generating an element array for the set of themed user interface elements included in the set of themed graphical user interfaces.

15. The system of claim 9, wherein the operations further comprise:
executing the program code to generate the thematic interface environment.

16. A computer program product comprising a computer readable storage medium having program instructions embodied therewith, the program instructions being executable by one or more processors to cause the one or more processors to perform operations comprising:
identifying a set of themed interface attributes within a set of themed graphical user interfaces including a set of themed user interface elements, wherein the set of themed user interface elements is formed by classifying user interface elements in the set of themed graphical user interfaces into a logical grouping based on thematic data derived from the user interface elements;
generating an artifact schema based on the set of themed interface attributes using a set of user interface models;
generating a set of automated interactions for obtaining user input data for configuring a thematic interface environment that is based on the artifact schema and the set of user interface models;
generating an input interface based on the set of automated interactions to obtain the user input data for configuring the thematic interface environment; and
generating program code for the thematic interface environment based on the user input data received through the input interface, the artifact schema, and the set of user interface models.

17. The computer program product of claim 16, wherein generating the artifact schema further comprises:
performing object recognition on the set of themed interface attribute within the set of themed graphical user interfaces.

18. The computer program product of claim 17, wherein the set of themed interface attributes includes an enterprise theme and a set of themed user interface elements, the enterprise theme and the set of themed user interface elements recurring within at least a portion of the themed graphical user interfaces of the set of themed graphical user interfaces.

19. The computer program product of claim 17, wherein the operations further comprise:
generating the set of user interface models based on the set of themed interface attributes.

20. The computer program product of claim 16, wherein the operations further comprise:
performing a visual scrape of the set of themed graphical user interfaces; and
generating an element array for the set of themed user interface elements included in the set of themed graphical user interfaces.

* * * * *